United States Patent [19]
Throckmorton et al.

[11] 3,985,677
[45] Oct. 12, 1976

[54] PREPARATION OF POLYMERIZATION CATALYST AND POLYMERIZATION THEREWITH

[75] Inventors: Morford C. Throckmorton, Akron; Paul H. Sandstrom, Tallemadge, both of Ohio

[73] Assignee: The Goodyear Tire & Rubber Company, Akron, Ohio

[22] Filed: June 24, 1974

[21] Appl. No.: 482,119

Related U.S. Application Data

[62] Division of Ser. No. 301,397, Oct. 27, 1972, Pat. No. 3,845,029.

[52] U.S. Cl. .............................. 252/429 B; 526/93; 526/133; 526/160
[51] Int. Cl.² .......................................... C08F 4/14
[58] Field of Search ............... 252/429 B; 260/94.3, 260/84.1

[56] References Cited
UNITED STATES PATENTS

| | | | |
|---|---|---|---|
| 3,464,965 | 9/1969 | Yasunaga et al. | 260/94.3 |
| 3,471,462 | 10/1969 | Matsumoto et al. | 252/429 B |
| 3,483,177 | 12/1969 | Throckmorton | 252/429 B |

*Primary Examiner*—Patrick P. Garvin
*Attorney, Agent, or Firm*—F. W. Brunner; J. Y. Clowney

[57] ABSTRACT

A method of polymerizing butadiene and/or butadiene in mixture with other diolefins to form polymers with a high cis-1,4 addition wherein the improvement relates to improved catalysts for producing the high cis-1,4-polybutadiene.

2 Claims, No Drawings

PREPARATION OF POLYMERIZATION CATALYST AND POLYMERIZATION THEREWITH

This is a divisional application of Ser. No. 301,397, filed Oct. 27, 1972, now U.S. Pat. No. 3,845,029.

This invention is directed to a method of polymerization of butadiene and/or butadiene in mixture with other diolefins to form polymers with a high content of cis-1,4 addition. It is also directed to the preparation of and to catalyst systems useful for this purpose. More specifically, the invention relates to improved catalysts for producing high cis-1,4-polybutadiene. Polybutadiene polymers have been found to possess properties which make them useful as synthetic rubbers.

There are other prior art methods for the preparation and use of preformed nickel catalysts for the polymerization of butadiene. In these prior art methods high cis-1,4-polybutadiene is produced by contacting butadiene with a specific catalyst. Said catalyst is prepared by mixing, in the presence of a hydrocarbon solvent, a first component of at least one compound selected from the group consisting of organometallic compounds of alkali metals and metals of Groups II and III of the Periodic Table, a second component of at least one compound selected from the group consisting of nickel salts of carboxylic acids and organic complex compounds of nickel and a third component of at least one compound selected from the group consisting of boron fluoride and complex compounds thereof and a fourth component of an aliphatic hydrocarbon having two conjugated double bonds, said catalyst being prepared in such a way, that the fourth component is added before the reaction between the first and second components and subjecting the resulting mixture to aging at a temperature of 20° C. to 100° C. It is believed that the use of aliphatic hydrocarbon having two conjugated double bonds in some manner stabilizes the catalyst so that the catalyst maintains its activity over relatively long periods of time.

It has been found that such preformed catalysts can be preformed in other than the presence of aliphatic hydrocarbons having two conjugated double bonds to form a stabilized catalyst which maintains high activity over a relatively long period of time.

It has been found that the catalyst can be preformed in the presence of a polymer cement or polymer solution which may have been freshly prepared in an adjacent or another polymerization process by the polymerization of at least one conjugated diolefin or which could be obtained by dissolving the dry finished polymer of a conjugated diolefin or of a copolymer of conjugated diolefin and styrene or a methyl substituted styrene in a suitable hydrocarbon solvent such as benzene or alternatively preforming in the presence of a liquid polymer of a conjugated diolefin. Such polymers will hereinafter be referred to as polymeric catalyst stabilizers.

The process employed in the performance of this invention has shown many advantages over the prior art methods. Once the catalyst has been preformed by mixing in the presence of the polymeric catalyst stabilizer, it is not necessary to constantly agitate the mixture in order to keep it in suspension. The preformed mixure may be a homogeneously suspended mixture, due to the highly viscous nature of the polymer cement. The polymer polybutadiene cement is completely dry and free of air since it has already been through contact with the catalyst, whereas fresh aliphatic hydrocarbons having two conjugated double bonds such as butadiene might be wet or contaminated. By the method employed in this invention, the same materials polymrized can be used to stabilize the catalysts without the need of an additional amount of hydrocarbon solvent.

Another exceptional advantage is that in some instances polymer stabilized catalysts produce polymers which have uniform molecular weight both before and after catalyst aging; whereas polymers prepared with other aged, preformed catalysts of the prior art always produce higher molecular weight polymer after the aging period than polymers produced by the same preformed catalysts before aging.

Other advantages obtained by the practice of the invention of this application are readily apparent to those skilled in he art, as the description proceeds.

Thus, it is an object of this invention to provide a method whereby catalysts, useful to polymerize butadiene to high cis-1,4polybutadiene, may be stabilized to maintain their activity over long periods of time without using a conjugated diolefin as the stabilizer.

It is another object to provide a method whereby butadiene can be polymerized to a high content, i.e. 90 percent or more, of cis-1,4-polybutadiene. Another object is to provide a catalyst system by which these polymerizations may be accomplished. Another object is to form copolymers of isoprene and butadiene in which the polybutadiene segment has a high content of cis-1,4 structure. Other objects will become apparent as the description proceeds.

According to the invention, butadiene or butadiene inn combination with other diolefins is polymerized under solution polymerization conditions with a catalyst comprising (1) at least one organoaluminum compound, (2) at least one organonickel compound selected from the group consisting of nickel salts of carboxylic acids, organic complex compounds of nickel, $\pi$ allyl type complexes of nickel, and nickel tetracarbonyl, and (3) at least one fluorine compound selected from the group of hydrogen fluoride, boron trifluoride, cmplexes of hydrogen fluoride and complexes of boron trifluoride, said complexes prepared by complexing hydrogen fluoride and/or boron trifluoride with a member of the class consisting of ketones, ethers, esters, alcohols, nitriles and water, said catalyst being preformed by mixing the catalyst components in the presence of a polymeric catalyst stabilizer selected from the group of polymers derived from the homopolymerization of hydrocarbon conjugated diolefins, the copolymerization of hydrocarbon conjugated diolefins with styrene or methyl substituted styrene, prior to contacting with the major portion of butadiene or butadiene in combination with other diolefins to be polymerized, said catalyst being prepared or preformed in such a manner that said polymeric catalyst stabilizer is added to the mixture before the reaction between the organoaluminum compound and the organonickel compound.

The polymeric catalyst stabilizer component of this invention can be derived from the polymerization of hydrocarbon conjugated dienes to form homopolymers where the number of carbon atoms in the diene monomer may range from four (4) to about twelve (12) and copolymers of the hydrocarbon conjugated dienes having from four (4) carbon atoms to about twelve (12) carbon atoms in each monomer.

The method by which these polymers are made does not appear to affect their ability to stabilize the preformed catalyst. They may be made by any of the prior art solution technigues; they may be made by any of the prior art emulsion polymerization techniques or bulk polymerization techniques.

If they are made by emulsion polymerization techniques, they are usually separated or isolated from the aqueous polymerization medium and then taken up in one of the aliphatic or aromatic solvents such as hexane, heptane or benzene. This is not to say that the polymers made by solution techniques cannot be dried down and then redissolved in a solvent; however, this just adds another manipulation in the catalyst preparation.

The polymers for stabilization may be solution polymerized using lithium as initiators. Also, Ziegler type catalysts as well as other organometallic catalyst systems may be used, including the catalyst disclosed in this application.

The microstructure of the polymer which is dictated by the type of catalyst used in the preparation does not seem to adversely affect the catalyst stabilizing ability of the polymer. For instance, a solution polymerized polybutadiene having a high cis-1,4 microstructure seems to have as good a stabilizing ability as a polymer of conjugated diolefins with a high 1,2-microstructure or an emulsion polymerized butadiene which has a mixed cis and trans-1,4 and also some 1,2 microstructure which has been dried down and redissolved in a solvent.

It doesn't seem to matter whether the molecular weight of the stabilizing polymer is high or low. For instance, a solution polymerized polybutadiene polymer having a low molecular weight rendering the polymer liquid-like, stabilizes the catalyst as well as a high molecular weight polybutadiene.

Thus, it could be said that both stereospecific polymers or copolymers can be used as polymeric catalyst stabilizers in the practice of this invention as well as random homopolymers and copolymers. In fact, solution and emulsion polymerized copolymers of butadiene and styrene known as SBR have been shown to possess excellent stabilizing properties.

Representative of the hydrocarbon conjugated dienes which may be utilized to make polymeric catalyst stabilizers of this invention are isoprene, 1,3-butadiene piperylene, 1,3-hexadiene, 1,3-heptadiene, 1,3-octadiene, 2,4-hexadiene, 2,4-heptadiene, 2,4-octadiene and 1,3-nonadiene. Also included are 2,3-dimethylbutadiene, 2,3-dimethyl-1,3-hexadiene, 2,3-dimethyl-1,3-heptadiene, 2,3-dimethyl-1,3-octadiene and 2,3-dimethyl-1,3-nonadiene and mixtures thereof.

Also, hydrocarbon conjugated dienes may be copolymerized with styrenes and methyl substituted styrenes to make polymeric catalyst stabilizers. These copolymers may be made by any of the prior art methods of preparation to make rubbery polymers which include solution polymerization, bulk solution polymerization and emulsion polymerization.

Representative of the hydrocarbon conjugated diene/styrene or methyl substituted styrene copolymers which may be utilized as polymeric catalyst stabilizers are 1,3-butadiene/styrene, 1,3-butadiene/α-methyl styrene, isoprene/styrene, isoprene/α-methyl styrene, piperylene/styrene, piperylene/α-methyl styrene, 2,3-dimethyl-1,3-butadiene/styrene, 2,3-dimethyl butadiene/α-methyl styrene, 1,3-butadiene/vinyl toluene, isoprene/vinyl toluene, piperylene/vinyl toluene, 2,3-dimethyl-1,3-butadiene/vinyl toluene, 1,3-butadiene/β-methyl styrene, isoprene/β-methyl styrene, piperylene/β-methyl styrene and 2,3-dimethyl-1,3-butadiene/β-methyl styrene.

The preparation of these homopolymers or copolymers of conjugated diolefins and copolymers of conjugated dienes with styrene or methyl substituted styrene are well known to those skilled in the art. The polymers may be formed by the well known solution polymerization techniques using mixtures of transition metal salts and organometallic reducing agents as catalysts or they may be prepared by well-known emulsion polymerization techniques using peroxy or redox type catalysts. Those skilled in the art are familiar with these known techniques.

By the term "organo aluminum compound" is meant any organo aluminum compound responding to the formula:

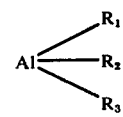

in which $R_1$ is selected from the group consisting of alkyl (including cycloalkyl), aryl, alkaryl, arylalkyl, alkoxy, hydrogen and fluorine, $R_2$ and $R_3$ being selected from the group of alkyl (including cycloalkyl), aryl, alkaryl, and arylalkyl. Representative of the compounds responding to the formula set forth above are: diethyl aluminum fluoride, di-n-propyl aluminum fluoride, di-n-butyl aluminum fluoride, diisobutyl aluminum fluoride, dihexyl aluminum fluoride, dioctyl aluminum fluoride, and diphenyl aluminum fluoride. Also included are diethyl aluminum hydride, di-n-propyl aluminum hydride, di-n-butyl aluminum hydride, diisobutyl aluminum hydride, diphenyl aluminum hydride, di-p-tolyl aluminum hydride, dibenzyl aluminum hydride, phenyl ethyl aluminum hydride, phenyl-n-propyl aluminum hydride, p-tolyl ethyl aluminum hydride, p-tolyl n-propyl aluminum hydride, p-tolyl isopropyl aluminum hydride, benzyl ethyl aluminum hydride, benzyl n-propyl aluminum hydride, and benzyl isopropyl aluminum hydride and other organoaluminum hydrides. Also diethylaluminum ethoxide, diisobutylaluminum ethoxide, and dipropylaluminum methoxide. Also included are trimethyl aluminum, triethyl aluminum, tri-n-propyl aluminum, triisopropyl aluminum, tri-n-butyl aluminum, triisobutyl aluminum, tripentyl aluminum, trihexyl aluminum, tricyclohexyl aluminum, trioctyl aluminum, triphenyl aluminum, tri-p-tolyl aluminum, tribenzyl aluminum, ethyl diphenyl aluminum, ethyl di-p-tolyl aluminum, ethyl dibenzyl aluminum, diethyl phenyl aluminum, diethyl p-tolyl aluminum, diethyl benzyl aluminum and other triorganoaluminum compounds. Also, by the term organoaluminum compounds is meant any compound responding to the formula R'R''$_3$LiAl where R' and R'' may be alkyl, alkaryl, or arylalkyl groups. R' and R'' may or may not be the same. Representative of these compounds are n-butyl-triisobutyl lithium aluminum, tetrabutyl-lithium aluminum, tetraisobutyl-lithium aluminum, butyl triethyl lithium aluminum and styryl tri-normal propyl lithium aluminum.

The component of the catalyst of this invention which contains nickel may be any organo nickel compound. It is preferred to employ a soluble compound of nickel. These soluble nickel compounds are normally compounds of nickel with a mono- or bi-dentate organic ligand containing up to 20 carbon atoms. "Ligand" is defined as an ion or molecule bound to and considered bonded to a metal atom or ion. Mono-dentate means having one position through which covalent or coordinate bonds with the metal may be formed; bi-dentate means having two positions through which covalent or coordinate bonds with the metal may be formed. By the term "soluble" is meant soluble in inert solvents. Thus, any salt or an organic acid containing from about 1 to 20 carbon atoms may be employed. Representative of organo nickel compounds are nickel benzoate, nickel acetate, nickel naphthenate, nickel octanoate, bis(α-furyl dioxime) nickel, nickel palmitate, nickel stearate, nickel acetylacetonate, nickel salicaldehyde, bis(cyclopentadiene) nickel, bis(-salicylaldehyde) ethylene diimine nickel, cyclopentadienyl-nickel nitrosyl, bis($\pi$-allyl nickel), bis($\pi$-cycloocta-1,5-diene nickel), bis ($\pi$-allyl nickel trifluoroacetate), and nickel tetracarbonyl. The preferred component containing nickel is a nickel salt of a carboxylic acid or an organic complex compound of nickel.

Of course, the hydrogen fluoride component of the catalyst is simply gaseous or liquid hydrogen fluoride. It, of course, should be anhydrous and as pure as possible. The hydrogen fluoride can be dissolved in a solvent and thus can be handled and charged to the system as a liquid solution. The solvent may be an alkyl, alkaryl, arylalkyl or aryl hydrocarbon, for example, benzene is a convenient solvent.

The boron trifluoride component of the catalyst is gaseous boron trifluoride. It, too, should be anhydrous and as pure as possible. The boron trifluoride can be dissolved in a solvent and thus can be handled and charged to the system as a liquid solution. The solvent may be an alkyl, alkaryl or aryl hydrocarbon, for example, benzene is a convenient solvent.

The hydrogen fluoride and/or boron trifluoride can also be utilized as complexes within the spirit of this invention. Hydrogen fluoride complexes and boron trifluoride complexes can readily be made with compounds which contain an atom or radical which is capable of lending electrons to or sharing electrons with hydrogen fluoride or boron trifluoride. Compounds capable of such associating are ethers, alcohols, ketones, esters, nitriles and water.

The ketone subclass can be defined by the formula

where R' and R represent alkyl, cycloalkyl, aryl, alkaryl and arylalkyl radicals containing from 1 to about 30 carbon atoms; R' and R may be the same or dissimilar. These ketones represent a class of compounds which have a carbon atom attached by a double bond to oxygen. Representative but not exhaustive of the ketones useful in the preparation of the ketone-hydrogen fluoride complexes or boron trifluoride complexes of this invention are dimethyl ketone, methyl ethyl ketone, dibutyl ketone, methyl isobutyl ketone, ethyl octyl ketone, 2,4-pentanedione, butyl cycloheptanone, acetophenone, amylphenyl ketone, butylphenyl ketone, benzophenone, phenyltolyl ketone, quinone and the like. The preferred ketones to form the ketone-hydrogen fluoride or ketone-boron trifluoride of this invention are the dialkyl ketones of which acetone is most preferred.

The nitrile subclass can be represented by the formula RCN where R represents an alkyl, cycloalkyl, aryl, alkaryl and arylalkyl and contain up to about 30 carbon atoms. The nitriles contain a carbon atom attached to a nitrogen atom by a triple bond. Representative but not exhaustive of the nitrile subclass are acetonitrile, butyronitrile, acrylonitrile, benzonitrile, tolunitrile, phenylacetonitrile, and the like. The preferred hydrogen fluoridenitrile complex or boron trifluoride nitrile complex prepared from the nitriles is hydrogen fluoride benzonitrile complex or boron trifluoride benzonitrile complex.

The alcohol subclass can be defined by the formula ROH where R represents alkyl, cycloalkyl, aryl, alkaryl, and arylalkyl radicals containing from about 1 to about 30 carbon atoms.

These alcohols represent a class of compounds which have a carbon atom attached by a single bond to oxygen which is in turn attached to a hydrogen by a single bond. Representative but not exhaustive of the alcohols useful in the preparation of the hydrogen fluoride complexes or boron trifluoride complexes ae methanol, ethanol, n-propanol, i-propanol, phenol, benzyl alcohol, cyclohexanol, butanol, hexanol and pentanol. The preferred hydrogen fluoride-alcohol complex or boron trifluoride alcohol complex is hydrogen fluoride phenolate complex or boron trifluoride phenolate complex.

The ether subclass can be defined by the formula R'OR where R and R' represent alkyl, cycloalkyl, aryl, alkaryl, and arylalkyl radicals containing from about 1 to about 30 carbon atoms; R and R' may be the same or dissimilar. The R's may also be joined through a common carbon bond to form a cyclic ether with the ether oxygen being an integral part of the cyclic structure such as tetrahydrofuran, furan or dioxane. These ethers represent a class of compounds which have two carbon atoms attached by single bonds to an oxygen atom. Representative but not exhaustive of the ethers useful in the preparation of the hydrogen fluoride complexes or boron trifluoride complexes of this invention are dimethyl, diethyl, dibutyl, diamyl, diisopropyl ethers, or tetrahydrofuran, anisole, diphenyl ether, ethyl methyl ether, dibenzyl ether and the like. The preferred hydrogen fluoride-ether complexes or boron trifluoride-ether complexes formed from the ethers are hydrogen fluoride diethyl etherate, hydrogen fluoride dibutyl etherate, boron trifluoride diethyl etherate and boron trifluoride dibutyl etherate complexes.

The ester subclass can be defined by the formula:

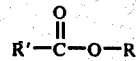

wherein R and R' are represented by alkyl, cycloalkyl, aryl, alkaryl and arylalkyl radicals containing from 1 to about 20 carbon atoms. The esters contain a carbon atom attached by a double bond to an oxygen atom as indicated. Representative but not exhaustive of the esters are ethyl benzoate, amyl benzoate, phenyl acetate, phenyl benzoate and other esters conforming to the formula above. The preferred hydrogen fluoride-ester complex is hydrogen fluoride ethyl benzoate complex. The preferred boron trifluoride-ester complex is boron trifluoride ethyl benzoate complex.

The complexes of this invention are usually prepared by simply dissolving appropriate amounts of the complexing agent, for instance, a ketone, an ether, an ester, an alcohol, a nitrile or water, in a suitable solvent and an appropriate amount of the hydrogen fluoride or boron trifluoride in a suitable solvent and mixing the two solvent systems. This mixing should be done in the absence of water vapor. Another possible method would be to dissolve either the hydrogen fluoride or boron trifluoride or the complexing agent in a suitable solvent and adding the other component. Still another method of mixing would be to dissolve the complexing agent in a solvent and simply bubble gaseous hydrogen fluoride or boron trifluoride through the system until all of the complexing agent is reacted with the hydrogen fluoride or boron trifluoride. The concentrations may be determined by weight gain or chemical titration.

From this point on, we shall refer to the hydrogen fluoride, boron trifluoride, or any of their complexes as the "fluoride compounds".

The preformed catalyst system has come to be a means by which the types of catalysts used in this invention can be used advantageously for commercial size batches and continuous polymerization operations. Some of the advantages are stabilization of the catalyst for long periods of time, one-shot uniform makeup of the catalyst, uniform control of the polymerization unit, and a predictable uniform polymeric product.

In order to properly stabilize the catalyst, the polymeric catalyst stabilizer must be present before the organoaluminum compound has a opportunity to react with either the nickel compound or the fluoride compound.

If the catalyst system is preformed without the presence of at least a small amount of polymeric catalyst stabilizer, the chemical effect of the organoaluminum upon the nickel compound or the fluoride compound is such that the catalytic activity of the catalyst is greatly lessened and shortly thereafter rendered inactive. In the presence of at least a small amount of polymeric catalyst stabilizer, the catalytic or shelf life of the catalyst is greatly improved over the system without any polymeric catalyst stabilizer present.

One method of preparing the preformed catalyst so that it will be highly active and relatively chemically stable is to add the organoaluminum compound to the polymer cement solution and mix thoroughly before the organoaluminum comes into contact with the nickel compound. The nickel compound is then added to the polymer cement solution. Alternatively, the nickel compound may be mixed with the polymer cement first, followed by the addition of the organoaluminum compound. Then the fluoride compound is added to the polymer cement solution. It is not intended to preclude other orders or methods of catalyst addition, but it is emphasized that the polymer stabilizer must be present before the organoaluminum compound has a chance to react with either the nickel or the fluoride compound.

The amount of polymeric catalyst stabilizer used to preform the catalyst may be within the range of about 0.01 to 3 weight percent of the total amount of monomer to be polymerized. Expressed as a weight ratio of polymeric catalyst stabilizer to nickel, the amount of polymeric catalyst stabilizer present during the preforming step can be within the range of about 2 to 2000 times the concentration of nickel. The preferred weight ratio of polymeric catalyst stabilizer to nickel is from about 4:1 to about 300:1.

An example of the preparation of a preformed catalyst, but by no means a limitation, shows the components being charged in the following proportions and order:

1. Fifty-three (53) milliliters of a ten percent (10%) by weight solution of polybutadiene having a very high 1,4-cis content,
2. Three and six-tenths (3.6) milliliters of a 1.0 molar solution of triethylaluminum (TEAL) in benzene,
3. Three (3) milliliters of a one-tenth (0.1) molar solution of nickel octoate (NiOct) solution, and
4. Three (3) milliliters of a 1.0 molar solution of boron trifluoride etherate ($BF_3 \cdot Et_2O$) in benzene.

Although the catalyst prepared in accordance with this invention shows catalytic activity immediately upon being prepared, it has been observed that a short aging period, for example, 15 to 30 minutes, at moderate temperatures, for example, 50° C. does increase the activity of the catalyst which has been preformed in the presence of a polymeric catalyst stabilizer. This is to be contrasted with a catalyst using the same components which has not been preformed in the presence of a polymeric catalyst stabilizer but has been aged in a similar manner, results in a catalyst that has reduced catalytic activity for promoting polymerization of conjugated diolefins.

The catalyst prepared in accordance with this invention shows a much greater catalytic activity in polymerization rate than the same catalyst components not preformed in the presence of a polymeric catalyst stabilizer. This results in an economic advantage in the use of the catalyst prepared in accordance with the practice of this invention.

One might wonder if some residual monomer remaining in the polymer cement could be acting as the stabilizer as referred to in the discussion of the prior art. To determine if in fact this was the case, some of the polymer was washed and extracted repeatedly to remove all traces of residual monomer, and then this cleaned up polymer was dissolved in a solvent to be used as the polymeric catalyst stabilizer in the preforming mixture. To protect the polymer during the washing and extracting steps, additional antioxidant was added to the polymer. It is believed that all of this antioxidant may not have been removed and would thus tend to contaminate or deactivate some of the preformed catalyst. This could possibly explain why the activity of the catalyst preformed in the presence of the polymeric catalyst stabilizer might, in some cases, be less than the activity of the catalyst preformed in the presence of the conjugated diene monomer.

Furthermore, the physical properties and possibilities of cis 1,4 polybutadiene are greatly influenced by the molecular weight. Thus, it is important to control the molecular weight of cis 1,4 polybutadiene. By the use of the catalyst of the present invention, it is possible to very easily control molecular weight of the polybutadiene formed by the use of the catalysts of this invention. It has usually been found that the higher the temperature at which the catalyst was aged, the higher the resulting molecular weight of the polymer.

The polymeric stabilized preformed catalyst system has polymerization activity over a wide range of catalyst concentration and catalyst ratios. The three catalyst components, and the polymer catalyst stabilizer, interreact to form the active catalyst. As a result, the optimum concentration for any one component is very dependent upon the concentrations of each of the other two catalyst components. Furthermore, while polymerization will occur over a wide range of catalyst concentrations and ratios, polymers having the most desirable properties are obtained over a narrower range. Polymerization can occur while the mole ratio of the organoaluminum compound (Al) to the organo nickel compound (Ni) ranges from about 0.3/1 to about 300/1; the mole ratio of the fluoride compound to the organonickel compound (Ni) ranges from about 0.5/1 to about 200/1 and the mole ratio of the fluoride compound to the organoaluminum compound ranges from about 0.2/1 to about 10/1. However, the preferred mole ratios of Al/Ni ranges from about 2/1 to about 80/1, the preferred mole ratio of the fluoride compound/Ni ranges from about 3/1 to about 100/1 and the preferred mole ratio of the fluoride compound-/Al ranges from about 0.4/1 to about 7/1.

The concentration of the catalyst employed depends on factors such as purity, rate desired, temperature and other factors, therefore, specific concentrations cannot be set forth except to say that catalytic amounts are used. Some specific concentrations and ratios which produce elastomers having desirable properties will be illustrated in the examples given herein to explain the teachings of this invention.

In general, the polymerizations of this invention are carried out in any inert solvent, and are, thus, solution polymerizations. By the term "inert solvent" is meant that the solvent or diluent does not enter into the structure of the resulting polymer nor does it adversely affect the properties of the resulting polymer nor does it have any adverse effect on the activity of the catalyst employed. Such solvents are usually aliphatic, aromatic, or cycloaliphatic hydrocarbons, examples of which are pentane, hexane, toluene, benzene, cyclohexane and the like. Preferred solvents are hexane and benzene. The solvent/monomer volume ratio may be varied over a wide range. Up to 20 or more to 1 volume ratio of solvent to monomer can be employed. It is usually preferred or more convenient to use a solvent-/monomer volume ratio of about 3/1 to about 6/1. Suspension polymerization may be carried out by using a solvent, e.g., butane or pentane, in which the polymer formed is insoluble. It should be understood, however, that it is not intended to exclude bulk polymerizations from the scope of this application.

It is usually desirable to conduct the polymerizations of this invention employing air-free and moisture-free techniques.

The temperatures employed in the polymerizations of this invention are not critical and may vary from a very low temperature such as $-10°$ C. or below up to high temperatures such as $100°$ C. or higher. However, it is usually more desirable to employ a more convenient temperature between about $30°$ C. and about $90°$ C.

The practice of this invention is further illustrated by reference to the following examples which are intended to be representative rather than restrictive of the scope of this invention. Unless otherwise noted, all parts and percentages are by weight. Dilute solution viscosities (DSV) have been determined in toluene at $30°$ C.

EXAMPLE I

Three preformed catalysts were prepared; the first contained no polymeric catalyst stabilizer, the second contained 0.81 gram of butadiene monomer and the third contained 0.81 gram of high cis-1,4-polybutadiene as polymeric catalyst stabilizers. To prepare the catalysts, 21 and 13 milliliters of benzene were added respectively to the bottles in which the first and second catalysts were to be prepared. The butadiene monomer was added as 8.1 ml. of a butadiene in benzene solution, and the polybutadiene was added as 21 ml. of a solution which had been prepared by dissolving 2 grams of polybutadiene rubber in 50 ml. of benzene. Then 4 ml. of 0.5 molar triethylaluminum (TEAL), 3 ml. of 0.05 molar nickel octoate (NiOct), and 7 ml. of 0.25 molar boron trifluoride etherate ($BF_3 \cdot Et_2O$) complex were syringed in that order into each of the three bottles. After the components were mixed the catalysts were permitted to stand at room temperature ($25°$ C.) for an hour before they were evaluated.

The catalysts were evaluated by syringing 1.75 ml. of the above solutions into a series of bottles containing 10 grams of butadiene in 100 ml. of a purified butadiene in benzene premix solution. This was equivalent to 0.4 gram of either butadiene or polybutadiene plus TEAL:NiOct:$BF_3 \cdot Et_2O$ = 1.0:0.075:0.87 millimole per 100 g. butadiene in the premix. The capped bottles were placed in a water bath maintained at $50°$ C. and tumbled end-over-end for 1 hour. The polymerizations were terminated by adding triisopropanolamine and an antioxidant. The polymers were dried under vacuum to constant weight. The results are shown in Table 1.

Table 1

| Exp. No. | Stabilizer | Polymer Yield, Wt.% | DSV, dl/g. |
|---|---|---|---|
| 1 | None | 14 | 4.77 |
| 2 | Butadiene | 63 | 2.65 |
| 3 | High cis-1,4-polybutadiene | 71 | 2.86 |

EXAMPLE II

The polymerizations were conducted in a manner relatively similar to that described in Example I except that the preformed catalysts were prepared using different polymers derived from conjugated dienes as polymeric catalyst stabilizers, and they are compared with a preformed catalyst which contained no polymeric catalyst stabilizer.

The yields columns show the percent conversion comparing the activity of the various polymer stabilized catalysts with the nonstabilized catalyst when fresh and after aging for one day.

Table 2

| POLYDIENES AS CATALYST STABILIZERS | | | | |
|---|---|---|---|---|
| Catalysts-Polymer Cement/TEAL/NiOct/$BF_3 \cdot Et_2O$= */1.0/0.075/0.87mhm | | | | |
| | | Catalyst Age | | |
| Exp. | Polymeric Catalyst | Yields, % in 2 Hrs. | | Polymer DSV |
| No. | Stabilizer | Fresh | 1 Day | Fresh | 1 Day |
| 1 | None | 29 | 24 | 3.6 | 5.7 |
| 2 | A | 88 | 88 | 2.9 | 3.6 |
| 3 | B | 80 | 86 | 3.0 | 3.3 |
| 4 | C | 77 | 92 | 3.3 | 4.1 |
| 5 | D | 75 | 85 | 3.1 | 2.8 |
| 6 | E | 84 | 86 | 2.7 | 2.7 |
| 7 | F | 57 | ND[1] | 2.9 | ND |

Table 2-continued
POLYDIENES AS CATALYST STABILIZERS

Catalysts-Polymer Cement/TEAL/NiOct/BF$_3$ . Et$_2$O= */1.0/0.075/0.87mhm

| Exp. No. | Polymeric Catalyst Stabilizer | Catalyst Age Yields, % in 2 Hrs. Fresh | 1 Day | Polymer DSV Fresh | 1 Day |
|---|---|---|---|---|---|
| 8 | G | 76 | 75 | 3.0 | 3.9 |

*0.4 grams of polymer was charged (only 0.2 grams with liquid polybutadiene). 0.405 grams of butadiene is 7.5 millimole. The polybutadienes were assumed to be equivalent to 7.5 millimole butadiene, the SBR's (25% styrene) were approximately 5.6 millimole of butadiene and the Natsyn was approximately 6.1 millimole of isoprene.
$^1$ND = not determined.
A Solution polybutadiene having about 97% cis-1,4 structure.
B Solution alkyl lithium polymerized polybutadiene having about 40% cis, 50% trans, and 10% 1,2 microstructure.
C Solution polymerized polybutadiene having about 91% 1,2 microstructure.
D Random solution polymerized styrene butadiene copolymer having 25% styrene/24% cis, 30% trans and 21% 1,2 polybutadiene structure; Mooney (ML-4 at 212° F.) viscosity = 55.
E Random solution polymerized styrene/butadiene copolymer having 25% styrene/26% cis-1,4, 41% trans-1,4 and 8% 1,2-polybutadiene structure; Mooney (ML-4) viscosity = 40.
F Solution polymerized cis-1,4-polyisoprene.
G Liquid polybutadiene-molecular weight was 2600 with 85% cis-1,4-microstructure.

The microstructures of four of the polymers prepared using polymeric catalyst stabilizers listed in Table 2 were determined by infrared analysis, and in every instance the polymers contained approximately 97% cis-1,4-polybutadiene and about 1.5% each of trans-1,4 and 1,2-polybutadiene. Catalysts containing stabilizers B, C, D, E and G produced polymers analyzing respectively, 97.4, 97.2, 97.4, 97.6 and 98.0 percent cis-1,4-polybutadiene.

EXAMPLE III

The polymerizations were conducted in a manner similar to that described in Example I, except for the method of preparing the polymeric stabilized preformed catalyts used in these experiments. In this instance, two polymeric stabilized preformed catalysts were prepared using high cis-1,4-polybutadiene cements, which had not been stopped or dried, as the polymeric catalyst stabilizers. The polybutadiene cements used as polymeric catalyst stabilizers were prepared by charging "in situ" amounts of TEAL:NiOct:BF$_3$.Et$_2$O equal to 1.1:0.05:0.75 millimole per 100 g. of butadiene and permitting the polymerization to proceed for 18 hours, or about 95 percent conversion. One bottle of cement contained 2.5 gram of polybutadiene as a five percent cement in benzene while a second bottle contained 5.0 gram of polybutadiene as a 10 percent cement. Then 1.3 ml. of 0.17 molar NiOct, 2.7 ml. of 1.0 molar TEAL and 2.25 ml. of 1.0 molar BF$_3$.Et$_2$O were added in that order to each of the cements.

One thirtieth (1.9 ml.) of the volume of these polymeric stabilized preformed catalysts were used to initiate polymerization of fresh butadiene-benzene premix. Thus the catalyst charge from these two preformed catalysts was 0.83 and 1.67 grams, respectively, of polybutadiene plus NiOct:TEAL:BF$_3$.Et$_2$O=0.075:0.90:0.75 millimole per 100 gram of butadiene in the fresh premix.

The pertinent polymerization results are presented in Table 3.

Table 3

| Exp. No. | Polymeric Stabilizer, Polybutadiene, g/100 g.BD | Polymer Yield in 2 Hrs., Wt. % | DSV, dl/g. |
|---|---|---|---|
| 1 | 0.83 | 68 | 2.74 |
| 2 | 1.67 | 74 | 2.73 |
| 3 | None | 22 | 3.65 |

EXAMPLE IV

The following table illustrates how a liquid polybutadiene polymer which has been washed and extracted serves as a polymeric catalyst stabilizer.

The liquid polybutadiene was prepared using solution polymerization techniques and a catalyst comprising a nickel compound and ethyl aluminum sesquichloride. The resulting polymer had a molecular weight of 2600 and was liquid-like in flow characteristics.

Table 4

Catalyst-PolyBD/TIBAL/NiOct/Hf . Et$_2$O = */1.0/0.1/3.0 mhm

| Exp. No. | Liquid PolyBD g/100 g.BD | Catalyst Age,(Hrs.) | Polymer Yield % 2 Hrs | DSV |
|---|---|---|---|---|
| 1 | 0 | 0.5 | 0 | — |
| 2 | 0.11 | 0.5 | 80 | 5.68 |
| 3 | 0.27 | 0.5 | 80 | 5.61 |
| 4 | 0.54 | 0 | 83 | ND$^1$ |

*Liquid PolyBD is variable.
$^1$ND = not determined.

EXAMPLE V

Four grams of dried styrene-butadiene copolymer (stabilizer D in Table 2) were dissolved in 100 ml. of benzene, and aliquots of this solution containing 0.053, 0.106, 0.21 and 1.6 gram of SBR were used to prepare a series of four polymeric stabilized preformed catalysts. Aliquots of these catalysts and of a nonstabilized catalyst were evaluated by polymerizing butadiene, using the procedure described in Example I. The amount of copolymer charged varied as reported in Table 5, column 2, while the amount of the other catalyst components was uniform at NiOct/TEAL/BF$_3$.Et$_2$O = 0.075/1.0/0.87 millimole per 100 grams of butadiene in the premix. The catalysts were evaluated when freshly prepared and after aging at 25° C. for 1 day. The polymerizations were run for 2 hours. Results are summarized in Table 5.

TABLE 5

| Exp. No. | SBR, g./100 g.BD | Catalyst Age Polymer Yields Fresh | 1 day | DSV Fresh | 1 day |
|---|---|---|---|---|---|
| 1 | 0 | 29 | 28 | ND$^1$ | ND |
| 2 | 0.026 | 68 | 59 | 2.8 | 4.0 |
| 3 | .053 | 70 | 85 | 2.8 | 3.0 |
| 4 | .106 | 73 | 86 | 2.8 | 3.0 |
| 5 | .80 | ND | 88 | — | 3.0 |

$^1$ND = not determined.

EXAMPLE VI

Emulsion polymerized SBR (SBR-1502) was evaluated as a stabilizer for preformed catalyst in a manner similar to that described in Example V. Results are summarized in Table 6.

Table 6

| Exp. No. | SBR, gphm[1] | Catalyst Age Yield, Wt.% | | DSV | |
|---|---|---|---|---|---|
| | | Fresh | 1 day | Fresh | 1 day |
| 1 | 0.036 | 85 | 71 | 2.74 | 3.56 |
| 2 | 0.108 | 83 | 84 | 2.70 | 2.95 |

[1]gphm = grams per 100 grams of monomer.

While certain representative embodiments and details have been shown for the purpose of illustrating the invention, it will be apparent to those skilled in this art that various changes and modifications may be made therein without departing from the spirit and scope of the invention.

What is claimed is:

1. In a composition suitable for use as a catalyst comprising (1) at least one organoaluminum compound, (2) at least one organonickel compound selected from the group consisting of nickel salts of carboxylic acids, organic complex compounds of nickel, and nickel tetracarbonyl, and (3) at least one fluorine compound selected from the group consisting of hydrogen fluoride, boron trifluoride, complexes of hydrogen fluoride and complexes of boron trifluoride, said complexes prepared by complexing hydrogen fluoride and/or boron trifluoride with a member of the class consisting of ketones, esters, ethers, alcohols, nitriles and water, the improvement comprising preforming said catalyst by mixing the catalyst components in the presence of a polymeric catalyst stabilizer selected from the group consisting of polymers derived from the homopolymerization of hydrocarbon conjugated diolefins, the copolymerization of hydrocarbon conjugated diolefins and the copolymerization of hydrocarbon conjugated diolefins with styrene or methyl substituted styrene, said catalyst being prepared or preformed in such a manner that said polymeric catalyst stabilizer is added to the mixture before the reaction between the organoaluminum compound and the organonickel compound, in which the mole ratio of the organoaluminum compound/organonickel compound ranges from about 0.3/1 to about 200/1, the mole ratio of the fluoride compound/organoaluminum compound ranges from about 0.2/1 to about 10/1 and the weight ratio of the polymeric catalyst stabilizer to the nickel in the organonickel compound ranges from about 2/1 to about 2000/1.

2. In the method of preparing a stabilized catalyst composition which comprises mixing (1) at least one organoaluminum compound, (2) at least one organonickel compound selected from the group consisting of nickel salts of carboxylic acids, organic complex compounds of nickel, and nickel tetracarbonyl, and (3) at least one fluorine compound selected from the group consisting of hydrogen fluoride, boron trifluoride, complexes of hydrogen fluoride and complexes of boron trifluoride, said complexes prepared by complexing hydrogen fluoride and/or boron trifluoride with a member of the class consisting of ketones, ethers, esters, alcohols, nitriles and water, the improvement comprising preforming said catalyst by mixing the catalyst components in the presence of a polymeric catalyst stabilizer selected from the group consisting of polymers derived from the homopolymerization of hydrocarbon conjugated diolefins, the copolymerization of hydrocarbon conjugated diolefins and the copolymerization of hydrocarbon conjugated diolefins with styrene or methyl substituted styrene, said catalyst being prepared or preformed in such a manner that said polymeric catalyst stabilizer is added to the mixture before the reaction between the organoaluminum compound and the organonickel compound, in which the mole ratio of the organoaluminum compound/organonickel compound ranges from about 0.3/1 to about 200/1, the mole ratio of the fluoride compound/organoaluminum compound ranges from about 0.2/1 to about 10/1 and the weight ratio of the polymeric catalyst stabilizer to the nickel in the organonickel compound ranges from about 2/1 to about 2000/1.

* * * * *